(12) United States Patent
Bessho et al.

(10) Patent No.: US 10,099,547 B2
(45) Date of Patent: Oct. 16, 2018

(54) WORK VEHICLE

(71) Applicant: Kubota Corporation, Osaka-shi (JP)

(72) Inventors: Hiroki Bessho, Sakai (JP); Toshiki Ono, Sakai (JP); Noriyasu Honjo, Sakai (JP); Hiroaki Kitaguchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/164,040

(22) Filed: May 25, 2016

(65) Prior Publication Data
US 2017/0001508 A1    Jan. 5, 2017

(30) Foreign Application Priority Data

Jul. 2, 2015   (JP) ................... 2015-133950
Dec. 10, 2015  (JP) ................... 2015-240949

(51) Int. Cl.
*B60K 5/04*     (2006.01)
*F16H 9/12*     (2006.01)
*B60K 13/04*    (2006.01)
*B60K 13/02*    (2006.01)
*B60K 17/08*    (2006.01)

(52) U.S. Cl.
CPC .............. *B60K 5/04* (2013.01); *B60K 13/02* (2013.01); *B60K 13/04* (2013.01); *B60K 17/08* (2013.01); *F16H 9/12* (2013.01)

(58) Field of Classification Search
CPC . B60K 5/04; B60K 11/06; B60K 5/00; B60K 13/04; B60K 11/00; B60K 13/02
See application file for complete search history.

(56) References Cited

U.S. PATENT DOCUMENTS

| 5,086,858 A  * | 2/1992  | Mizuta    | B60K 11/06  |
|                |         |           | 123/41.56   |
| 6,484,607 B2 * | 11/2002 | Shichinohe| F16H 45/02  |
|                |         |           | 192/3.31    |
| 6,957,532 B2 * | 10/2005 | Ito       | F16H 39/14  |
|                |         |           | 60/487      |
| 7,168,516 B2 * | 1/2007  | Nozaki    | B60K 13/02  |
|                |         |           | 123/198 E   |
| 7,717,206 B2 * | 5/2010  | Tanaka    | B60K 13/02  |
|                |         |           | 180/291     |

(Continued)

FOREIGN PATENT DOCUMENTS

JP          201251505        3/2012

*Primary Examiner* — Hau V Phan
(74) *Attorney, Agent, or Firm* — The Webb Law Firm

(57) ABSTRACT

A utility vehicle provided with an engine in a rear portion of a vehicle body is disclosed. The engine is provided with a cylinder head, and has an exhaust gas outlet port formed to be open in a front surface of the engine. An exhaust pipe extends forward from the exhaust gas outlet port, then curves, and extends rearward. A cover that covers a front portion of the exhaust pipe includes: a front-side portion that covers a front side of the front portion of the exhaust pipe; an upper-side portion that extends rearward from an upper end portion of the front-side portion and covers an upper side of the front portion of the exhaust pipe; and an extension portion that extends rearward from a rear end portion of the upper-side portion and covers an upper side of a front portion of the cylinder head.

23 Claims, 11 Drawing Sheets

(56) References Cited

U.S. PATENT DOCUMENTS

| | | | | |
|---|---|---|---|---|
| 8,002,061 B2* | 8/2011 | Yamamura | ............ | B60K 11/00 |
| | | | | 180/68.1 |
| 8,037,959 B2* | 10/2011 | Yamamura | ........... | B62D 25/084 |
| | | | | 180/68.4 |
| 8,210,297 B2* | 7/2012 | Kalisz | .................... | B60K 13/02 |
| | | | | 180/68.2 |
| 8,316,975 B2* | 11/2012 | Azuma | ................. | B60K 13/02 |
| | | | | 180/291 |
| 8,550,204 B2* | 10/2013 | Takagi | .................... | F01N 13/08 |
| | | | | 180/296 |
| 8,567,847 B1* | 10/2013 | King | ...................... | B60K 13/02 |
| | | | | 180/68.3 |
| 8,596,406 B2* | 12/2013 | Itoo | ..................... | F16H 57/0416 |
| | | | | 165/42 |
| 8,813,900 B2* | 8/2014 | Poulin | ..................... | B60K 5/00 |
| | | | | 180/309 |
| 8,863,887 B2* | 10/2014 | Kii | ...................... | F16H 57/0489 |
| | | | | 180/339 |
| 8,960,359 B2* | 2/2015 | Nogami | ................. | B60K 11/06 |
| | | | | 180/296 |
| 2009/0183937 A1* | 7/2009 | Yamamura | ............ | B60K 13/04 |
| | | | | 180/89.2 |

* cited by examiner

WORK VEHICLE

CROSS-REFERENCE TO RELATED APPLICATIONS

This application claims priority to Japanese Patent Application Nos. 2015-133950 and 2015-240949, filed Jul. 2, 2015 and Dec. 10, 2015, respectively, the disclosures of which are hereby incorporated in their entirety by reference.

BACKGROUND OF THE INVENTION

1. Field of the Invention

The present invention relates to work vehicles such as utility vehicles.

2. Description of the Related Art (1) First Related Art

JP 2012-051505 A discloses a work vehicle (more specifically, a utility vehicle) provided with an engine that is located in a rear portion of a vehicle body. An exhaust gas outlet port is open in a front surface of the engine. An exhaust pipe extends forward from the exhaust gas outlet port, then curves, and extends rearward. A seat is located forward of, and diagonally upward of, a front portion of the exhaust pipe.

In this utility vehicle, there is an open space between the exhaust pipe and the seat. Therefore, heat from the exhaust pipe is likely to reach the seat. Also, since there is an open space above a cylinder head of the engine, dust such as particles from straw is likely to accumulate on the engine. Furthermore, since there is an open space around the exhaust pipe, there is the risk of the temperature of exhaust pipe unnecessarily decreasing.

In light of the above situation, there is a demand for providing a utility vehicle that can prevent heat from the exhaust pipe from reaching the seat, prevent dust from accumulating on the engine, and prevent the temperature of the exhaust pipe from unnecessarily decreasing.

(2) Second Related Art

In a work vehicle disclosed in JP 2012-051505 A, an intake device that introduces air into an engine and an exhaust device that discharges exhaust gas from the engine are located on the same side of the engine in the right-left direction of the vehicle body. Therefore, the space around the engine includes an empty space on the side of the engine where the intake device and the exhaust device are not located, and is not effectively used for the layout of the intake/exhaust structure.

In light of the above problem, there is a demand for providing a work vehicle in which the space around the engine is effectively used for the layout of the intake/exhaust structure.

SUMMARY OF THE INVENTION (1) In view of "First Related Art", the following utility vehicle is provided.

A utility vehicle comprising:

an engine located in a rear portion of a vehicle body, the engine being provided with a cylinder head, and having an exhaust gas outlet port that is open in a front surface of the engine;

an exhaust pipe that extends forward from the exhaust gas outlet port, then curves, and extends rearward;

a seat that is located forward of, and diagonally upward of, a front portion of the exhaust pipe; and a cover that covers the front portion of the exhaust pipe, the cover including:

a front-side portion that covers a front side of the front portion of the exhaust pipe;

an upper-side portion that extends rearward from an upper end portion of the front-side portion and covers an upper side of the front portion of the exhaust pipe; and an extension portion that extends rearward from a rear end portion of the upper-side portion and covers an upper side of a front portion of the cylinder head.

With this configuration, the front side and the upper side of the front portion of the exhaust pipe is covered by the front-side portion and the upper-side portion of the cover. Therefore, radiant heat from the exhaust pipe is prevented from reaching the seat located forward of, and diagonally upward of, the exhaust pipe. Also, the upper side of the front portion of the cylinder head of the engine is covered by the extension portion of the cover. Therefore, dust such as particles from straw is prevented from accumulating on the engine. Furthermore, the front portion of the exhaust pipe is covered by the front-side portion and the upper-side portion of the cover. Therefore, heat from the exhaust pipe is more unlikely to escape compared to the case in which the area around the exhaust pipe is open, for example, and it is possible to prevent the temperature of the exhaust pipe from unnecessarily decreasing.

Therefore, one aspect of the present invention provides a utility vehicle that can prevent heat from the exhaust pipe from reaching the seat, prevent dust from accumulating on the engine, and prevent the temperature of the exhaust pipe from unnecessarily decreasing.

In one preferable embodiment, an upper surface of the cylinder head is inclined downward in a diagonally rearward direction, and a rear end portion of the cover extends to a position near a central position of the cylinder head in a front-rear direction, and is inclined downward in a diagonally rearward direction.

With this configuration, even if dust such as particles from straw falls down from above the cylinder head of the engine, the dust is likely to slip downward in a diagonally rearward direction along the contour of the cover. Furthermore, the dust is led from the cover to the cylinder head, and the dust is likely to slip downward in a diagonally rearward direction along the contour of the cylinder head. Therefore, it is possible to appropriately prevent dust from accumulating on the engine.

In one preferable embodiment, a clearance is provided between a rear end portion of the extension portion and the front portion of the cylinder head, and the cover is provided with a resin member that is heat resistant and elastic, and that fills the clearance.

With this configuration, a clearance for preventing vibrations of the cylinder head from being transmitted to the cover is provided in a gap between the rear end portion of the extension portion of the cover and the front portion of the cylinder head, and this clearance is filled with the resin member. Due to the presence of the resin member, dust is unlikely to fall onto the engine from the clearance. This resin member is heat resistant, and has high durability with which the resin member is unlikely to be deformed by heat from the engine. Furthermore, the resin member is elastic, and prevents vibrations of the cylinder head from being transmitted to the cover. Therefore, it is unlikely that a problem will arise in which the cover becomes loose due to vibrations of the cylinder head, for example.

In one preferable embodiment, the utility vehicle further comprises a load carrying platform configured to be mounted with luggage, and a gap extending in a front-rear direction is provided between the load carrying platform and the seat, and the cover is located below the gap.

With this configuration, even if dust falls toward the engine from a gap between the seat and the load carrying platform, the dust falling from the gap is received by the cover, and it is possible to prevent the dust from falling onto the engine.

In one preferable embodiment, the cover is formed to be wider than the exhaust pipe in a right-left direction of the vehicle body.

With this configuration, the cover covers the entire width of the exhaust pipe in the right-left direction, and prevents dust from falling onto the exhaust pipe.

In one preferable embodiment, the utility vehicle further comprises a framework that surrounds the engine, and the cover is fixed to the framework.

With this configuration, the vibration system of the framework differs from the vibration system of the engine, and usually vibrations of the framework are smaller than vibrations of the engine. Since the cover is fixed to the framework, it is unlikely that a problem will arise in which the cover becomes loose for example, compared to the case in which the cover is fixed to the engine itself, for example.

(2) In view of "Second Related Art", the following are provided.

A work vehicle comprising:

an engine located in a rear portion of a vehicle body;

an intake device configured to introduce air into the engine;

an exhaust device configured to discharge exhaust gas from the engine, wherein the intake device and the exhaust device are separately located on right and left sides of the engine.

With this configuration, the intake device that introduces air into the engine and the exhaust device that discharges exhaust gas from the engine are separately located on right and left sides of the engine. Thus, it is possible to appropriately arrange the intake device and the exhaust device by effectively using the left side space and the right side space with respect to the engine, out of the space around the engine.

Therefore, one aspect of the present invention realizes an intake/exhaust structure that is laid out by effectively using the space around the engine.

In one preferable embodiment, an exhaust gas outlet port that is connected to the exhaust device is formed in a front portion of the engine, and an intake air inlet port that is connected to the intake device is formed in a rear portion of the engine.

With this configuration, the exhaust gas outlet port connected to the exhaust device is formed in the front portion of the engine. Therefore, for example, when exhaust gas is discharged by the exhaust device from the rear part side of the travelling vehicle body, a long exhaust gas channel can be provided for the exhaust device and the efficiency of cooling exhaust gas can be improved in the exhaust device. Also, since the intake air inlet port connected to the intake device is formed in the rear portion of the engine, the intake device can be located at an appropriate position where the intake device does not interfere with the exhaust device.

In one preferable embodiment, the exhaust device is provided with a muffler configured to reduce exhaust sound, and the muffler is located rearward of the engine such that a longitudinal direction of the muffler extends along a front-rear direction of the vehicle body.

With this configuration, the muffler of the exhaust device is located rearward of the engine such that the longitudinal direction of the muffler extends along the front-rear direction of the vehicle body. Therefore, it is possible to compactly arrange the muffler such that a smaller amount of space is occupied by the muffler in the right-left direction of the vehicle body.

In one preferable embodiment, the exhaust device is provided with an exhaust pipe through which exhaust gas discharged from the engine passes through, and the exhaust pipe extends forward of the vehicle body from the engine, then curves, passes along a side of the engine to avoid the engine, and extends rearward of the vehicle body.

With this configuration, the exhaust pipe is located so as to extend forward of the vehicle body from the engine, then curve, pass along a side of the engine to avoid the engine, and extend rearward of the vehicle body. Therefore, the height of the exhaust pipe can be reduced, the length of the exhaust pipe can be increased, and the ability to cool exhaust gas can be improved.

In one preferable embodiment, the work vehicle further comprises a belt type continuously variable transmission mechanism to which power from the engine is input, wherein the exhaust pipe passes above the belt type continuously variable transmission mechanism.

With this configuration, the exhaust pipe is located so as to pass above the belt type continuously variable transmission mechanism, and therefore the space above the belt type continuously variable transmission mechanism can be effectively used as a space for the exhaust pipe.

In one preferable embodiment, the work vehicle further comprises:

a driving section provided forward of the engine in a front-rear direction of the vehicle body; and a first heat insulation member that separates the driving section and the exhaust pipe from each other.

With this configuration, heat from the exhaust pipe is blocked by the first heat insulation member and heat from the exhaust pipe is prevented from reaching the driving section. Also, the first heat insulation member prevents heat from the exhaust pipe from being excessively discharged. Therefore, for example, when the exhaust pipe is provided with a catalyst for purifying exhaust gas, the first heat insulation member prevents the temperature of exhaust gas from decreasing to be lower than an activating temperature at which the catalyst can appropriately function.

In one preferable embodiment, the work vehicle further comprises:

a load carrying platform provided upward of the engine; and a second heat insulation member that separates the load carrying platform and the exhaust pipe from each other.

With this configuration, the second heat insulation member prevents heat from the exhaust pipe from reaching the load carrying platform, and it is possible to prevent the load carrying platform from deteriorating due to heat from the exhaust pipe. Also, the second heat insulation member prevents heat from the exhaust pipe from being excessively discharged. Therefore, for example, when the exhaust pipe is provided with a catalyst for purifying exhaust gas, the second heat insulation member prevents the temperature of exhaust gas from decreasing to be lower than an activating temperature of the catalyst.

In one preferable embodiment, the intake device is provided with an air cleaner configured to remove dust from air, and the air cleaner is located rearward of the engine such that a longitudinal direction of the air cleaner extends along a front-rear direction of the vehicle body.

With this configuration, the air cleaner is located rearward of the engine such that the longitudinal direction of the air cleaner extends along the front-rear direction of the vehicle body. Therefore, it is possible to compactly arrange the air cleaner such that a smaller amount of space is occupied by the air cleaner in the right-left direction of the vehicle body.

In one preferable embodiment, the air cleaner is provided with a lid for element replacement, and the lid is formed on a rear end portion of the air cleaner.

With this configuration, the lid used when replacing an element of the air cleaner is formed in the rear end portion of the air cleaner. Therefore, it is possible to open and close the lid from the rear side of the vehicle body, and it is easy to perform maintenance to replace an element of the air cleaner.

In one preferable embodiment, the intake device is provided with an intake pipe through which air to be introduced to the engine passes, a front portion of the vehicle body is provided with a front hood, the intake pipe is provided with an external air intake port from which external air is introduced, and the external air intake port is located within an isolation space formed within the front hood.

With this configuration, the external air intake port of the intake pipe of the intake device is located within the isolation space formed within the front hood. Therefore, clean air in the isolation space, which is relatively less contaminated with dust or the like, can be introduced into the intake device.

In one preferable embodiment, the work vehicle further comprises:

a third heat insulation member that is located rearward of the engine and separates the intake device and the exhaust device from each other.

With this configuration, the third heat insulation member prevents heat from the exhaust device from reaching the intake device. Therefore, it is possible to prevent the intake device from deteriorating due to heat from the exhaust device.

In one preferable embodiment, the engine is provided in a horizontal orientation so that a crank shaft extends along a right-left direction of the vehicle body, and a cylinder head is inclined upward in a diagonally rearward direction.

With this configuration, the engine is provided in a horizontal orientation so that the crank shaft extends along the right-left direction of the vehicle body, and the cylinder head is inclined upward in a diagonally rearward direction. Therefore, the height of the engine can be reduced, and an empty space can be provided forward of the cylinder head.

In one preferable embodiment, the work vehicle further comprises:

a transmission case that is joined to a rear portion of the engine, the transmission case being provided with an oil feeding member for feeding hydraulic oil to the transmission case, wherein an upper end portion of the oil feeding member is located upward of the intake air inlet port.

With this configuration, the upper end portion of the oil feeding member for feeding hydraulic oil to the transmission case is located upward of the intake air inlet port. Therefore, it is easy to access the oil feeding member without being hindered by the intake device and so on, and it is easy to perform oil feeding work to feed hydraulic oil to the transmission case.

In one preferable embodiment, the work vehicle further comprises:

a transmission case that is joined to the rear portion of the engine; and an oil inspection stick used for inspecting a condition of hydraulic oil within the transmission case, the oil inspection stick having a grip that is located upward of the intake air inlet port.

With this configuration, a grip of the oil inspection stick used for inspecting the condition of hydraulic oil within the transmission case is located upward of the intake air inlet port. Therefore, it is easy to access the grip of the oil inspection stick without being hindered by the intake device and so on, and it is easy to perform inspection work to inspect hydraulic oil within the transmission case.

Other features, and advantageous effects achieved thereby will become apparent from reading the following description with reference to the accompanying drawings.

DESCRIPTION OF THE PREFERRED EMBODIMENTS

An embodiment of a utility vehicle (an example of the "work vehicle") will be described with reference to FIGS. 1 to 10.

Overall Configuration

Figure 1:
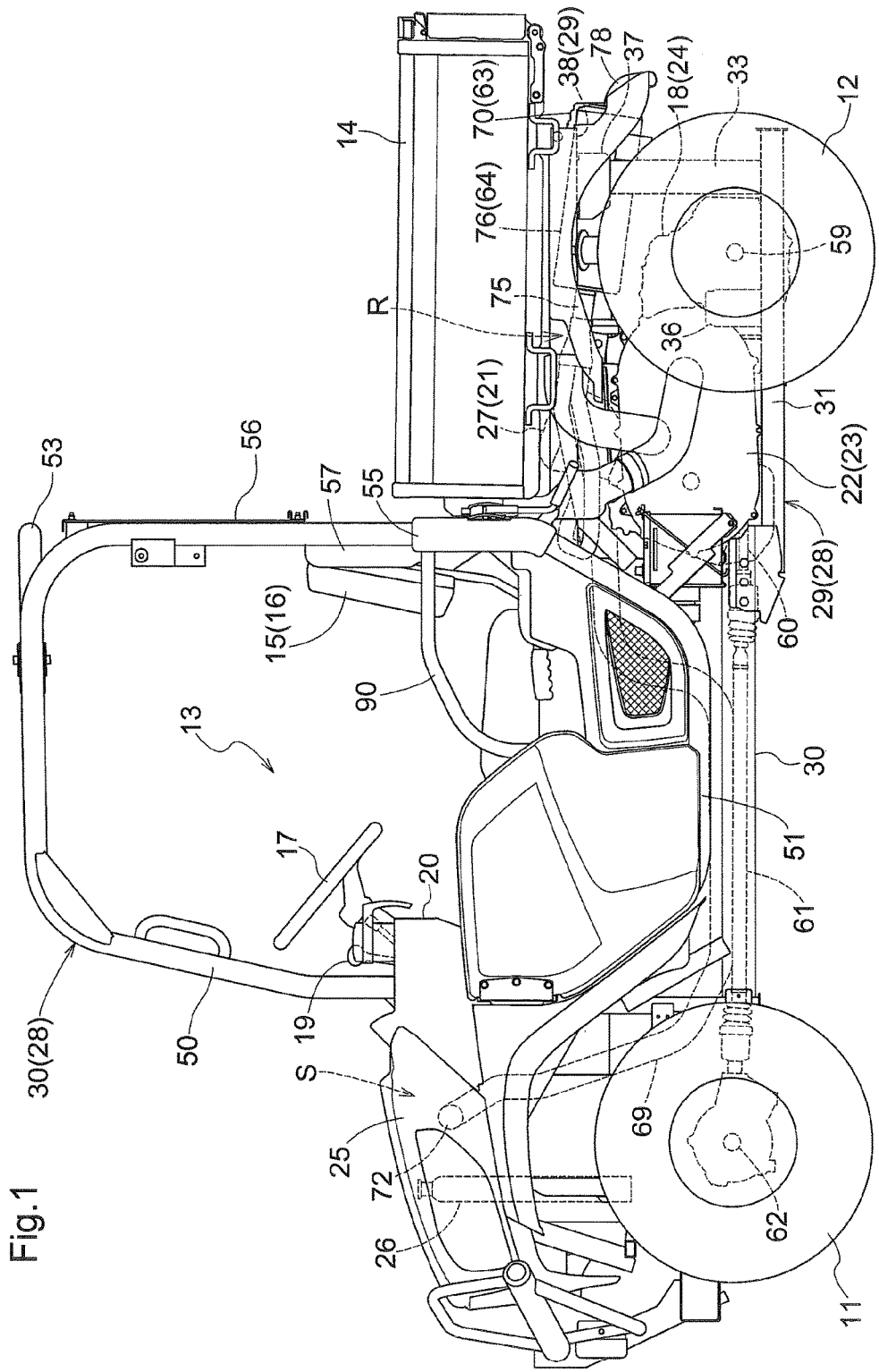
FIG. 1 is a left side view showing a utility vehicle.
Figure 2:
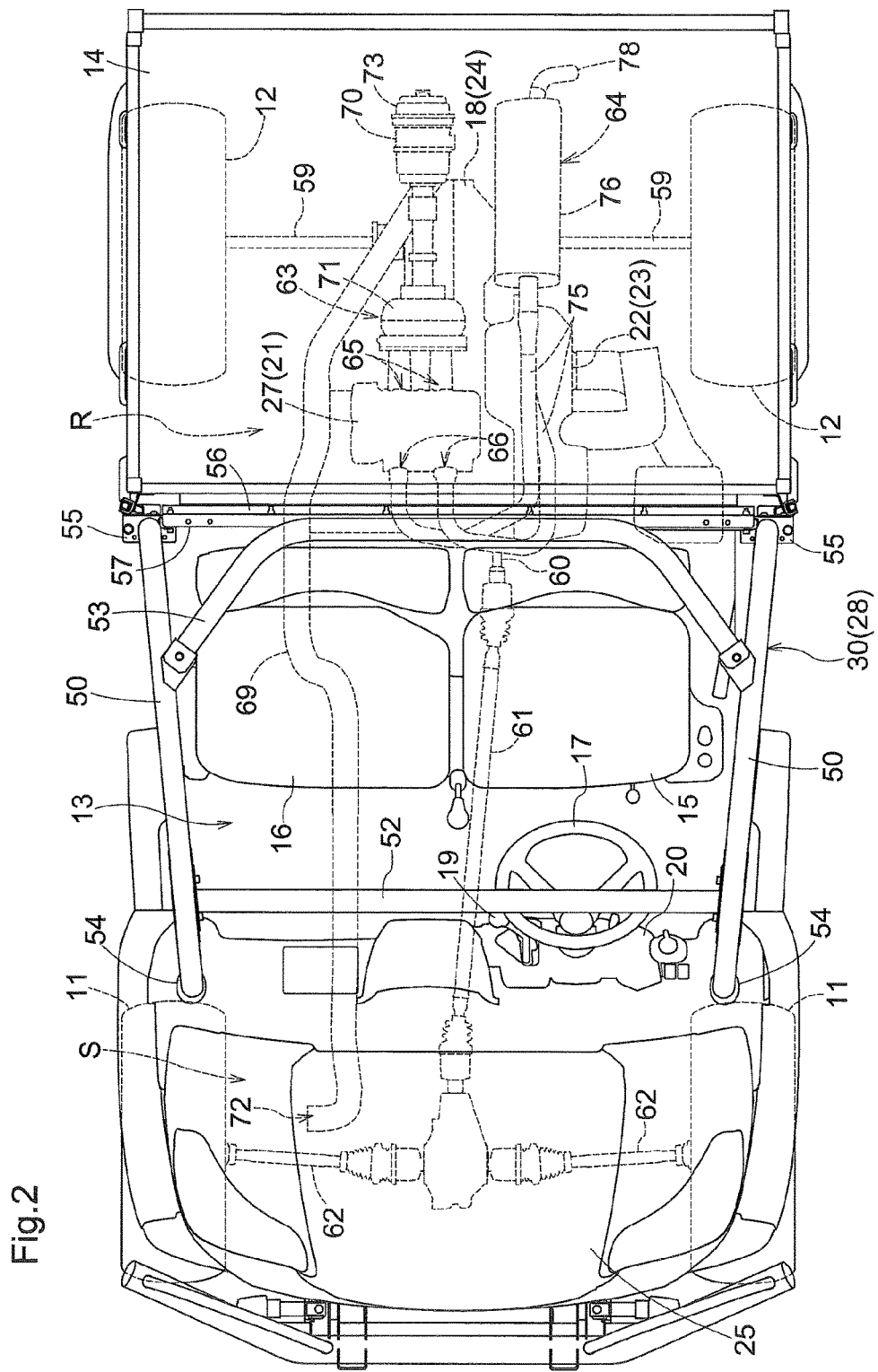
FIG. 2 is a plan view showing the utility vehicle.

A utility vehicle shown in FIGS. 1 and 2 is a vehicle used for many purposes such as transportation of luggage and recreation. The utility vehicle is provided with: a pair of right and left front wheels 11 that are steerable and are able to be driven; and a pair of right and left rear wheels 12 that are able to be driven; and a travelling vehicle body that is able to travel using the right and left front wheels 11 and the right and left rear wheels 12. A driving section 13 is provided in a central portion of the travelling vehicle body in a front-rear direction. In the travelling vehicle body, a load carrying platform 14 that is able to be mounted with luggage is provided rearward of the driving section 13. An engine room R is formed below the load carrying platform 14.

The driving section 13 is provided forward of an engine 21 in a front-rear direction of the vehicle body. The driving section 13 is provided with: for example, a driver's seat 15 (an example of the "seat") on which an operator can be seated; an auxiliary seat 16 (an example of the "seat") that is located adjacent to the driver's seat 15 and on which an occupant can be seated; a steering wheel 17 used for a steering operation; a shift lever 19 for a speed change operation; and so on. The steering wheel 17 and the shift lever 19 are located on a driving panel 20 that is located forward of the driver's seat 15.

The load carrying platform 14 is configured to be switchable to a mounting state in which the load carrying platform 14 can carry luggage placed thereon, and to a dumping state in which the load carrying platform 14 can discharge luggage. The load carrying platform 14 swings about a lateral axis, raises a front end portion thereof, and thus enters the dumping state in which the load carrying platform 14 can discharge luggage from a rear end portion side thereof. The state of the load carrying platform 14 changes due to being driven by a hydraulic actuator, for example.

Figure 4:
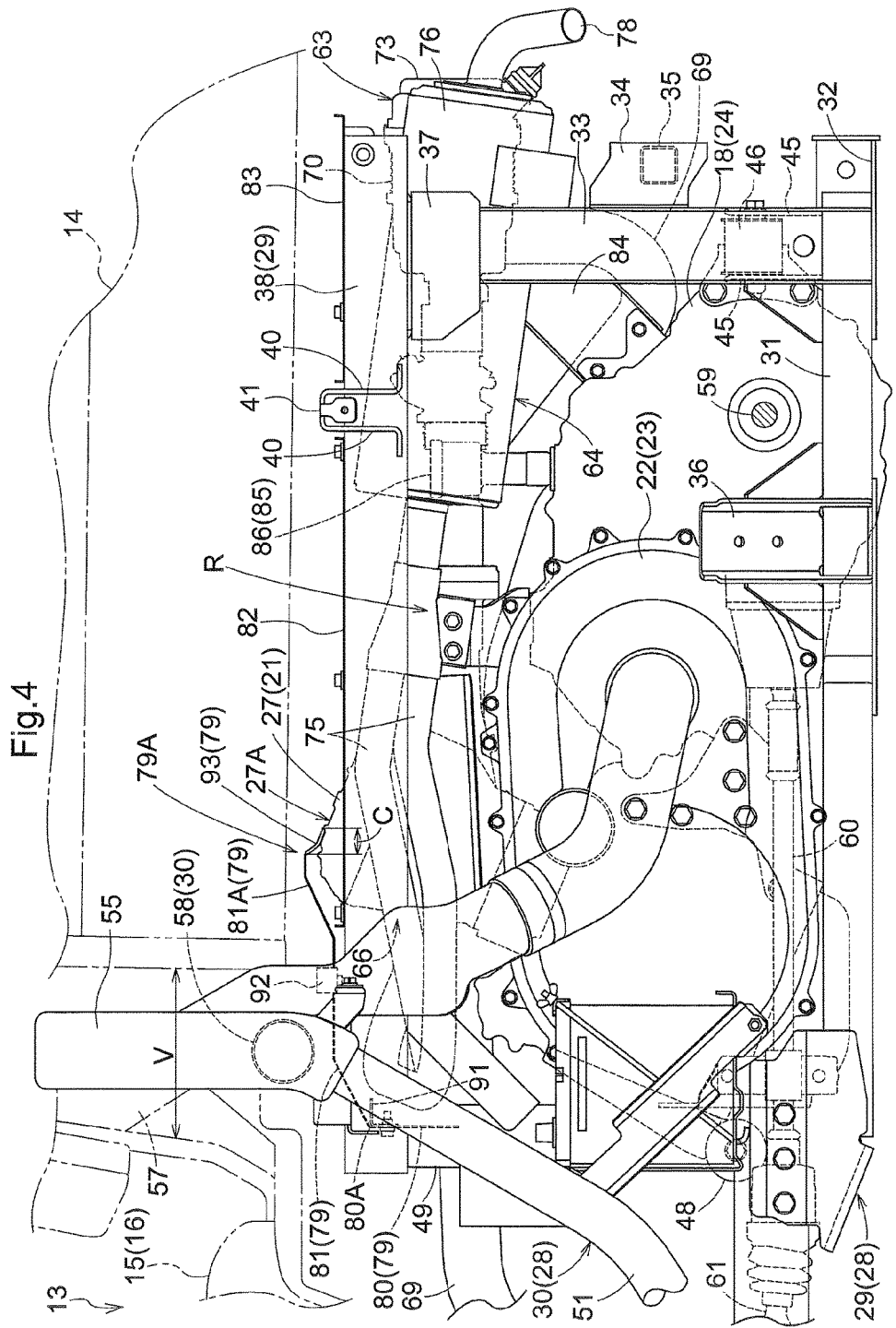
FIG. 4 is a left side view showing an area around the engine.
Figure 5:
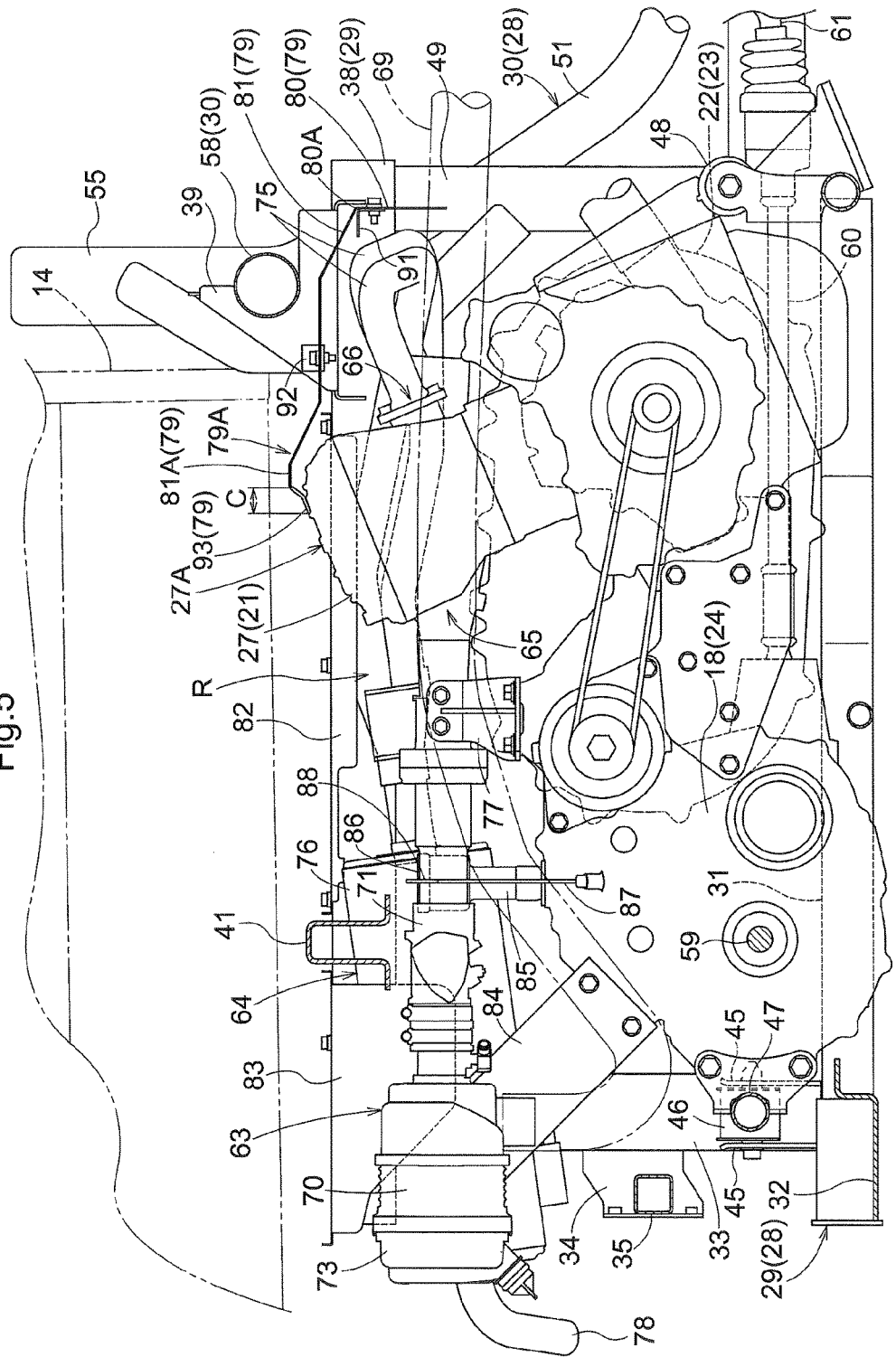
FIG. 5 is a right side view showing an area around the engine.

In the engine room R shown in FIGS. 1 to 6, 9 and 10: a water-cooling type gasoline engine 21 (simply referred to as "engine 21" hereinafter); a belt type continuously variable transmission mechanism 23 housed in a housing 22; a gear type transmission mechanism 24 housed in a transmission case 18; and so on are provided. The engine 21 is located in a rear portion of the travelling vehicle body. As shown in FIGS. 4, 5 and so on, the load carrying platform 14 is located upward of the engine 21, the housing 22, and the transmission case 18.

As shown in FIGS. 1 and 2, a front lid or a front hood 25 that is able to be opened and closed is provided in a front portion of the travelling vehicle body, forward of the driving section 13. A radiator 26 for cooling the engine 21 and so on are located in an isolation space S formed within the front hood 25 and the driving panel 20.

As shown in FIGS. 4 and 5, the engine 21 is provided in a horizontal orientation so that a crank shaft extends along the right-left direction of the vehicle body, and the cylinder head 27 is inclined upward in a diagonally rearward direction. Specifically, an upper surface 27A of the cylinder head 27 of the engine 21 is inclined downward in a diagonally rearward direction. The engine 21 is of a two-cylinder type.

As shown in FIG. 2 and so on, the housing 22, which houses the belt type continuously variable transmission mechanism 23, is joined to and supported on the lateral side of the engine 21 and the transmission case 18. The transmission case 18 is joined to and supported by a rear portion of the engine 21.

The transmission case 18 is provided such that the longitudinal direction of the transmission case 18 extends along a front-rear direction of the vehicle body. More specifically, the transmission case 18 is designed to be elongated in a front-rear direction of the vehicle body and to have a shape with a small overall height.

Frames

As shown in FIGS. 1, 2 and so on, the travelling vehicle body is provided with vehicle body frames 28. The vehicle body frames 28 include: mounting frames 29 (corresponding to "framework") that are mounted with and support the engine 21 and so on; protection frames 30 that surround and protect the driving section 13; and so on.

The mounting frames 29, which are shown in FIGS. 3 to 6 and so on, surround the engine 21. The mounting frames 29 include: right and left supporting frames 31 that extend along a front-rear direction; a lower horizontal frame 32 that extends in a right-left direction and joins the respective rear end portions of the right and left supporting frames 31 to each other; rear vertical frames 33 that respectively stand on rear end portions of the right and left supporting frames 31 and extend in a vertical direction; and an intermediate horizontal frame 35 that extends in a horizontal direction to join the right and left rear vertical frames 33 to each other via first brackets 34. The mounting frames 29 further include: front vertical frames 36 that are located forward of the rear vertical frames 33 and respectively stand on the supporting frames 31; upper front-rear frames 38 that are respectively joined to upper end portions of the rear vertical frames 33 via second brackets 37; and an upper intermediate horizontal frame 41 that joins intermediate portions, in a front-rear direction, of the right and left upper front-rear frames 38 to each other. The mounting frames 29 further include: front support post frames 49 that stand on a front end portion of the lower horizontal frame 32, extend in a vertical direction, and joined to front end portions of the upper front-rear frames 38. The mounting frames 29 further include: joint members 39 that are respectively joined to front end portions of the right and left upper front-rear frames 38; and support brackets 40 that are joined to rear end portions of the upper front-rear frames 38 and extend toward the lateral outer side of the vehicle body.

Figure 6:
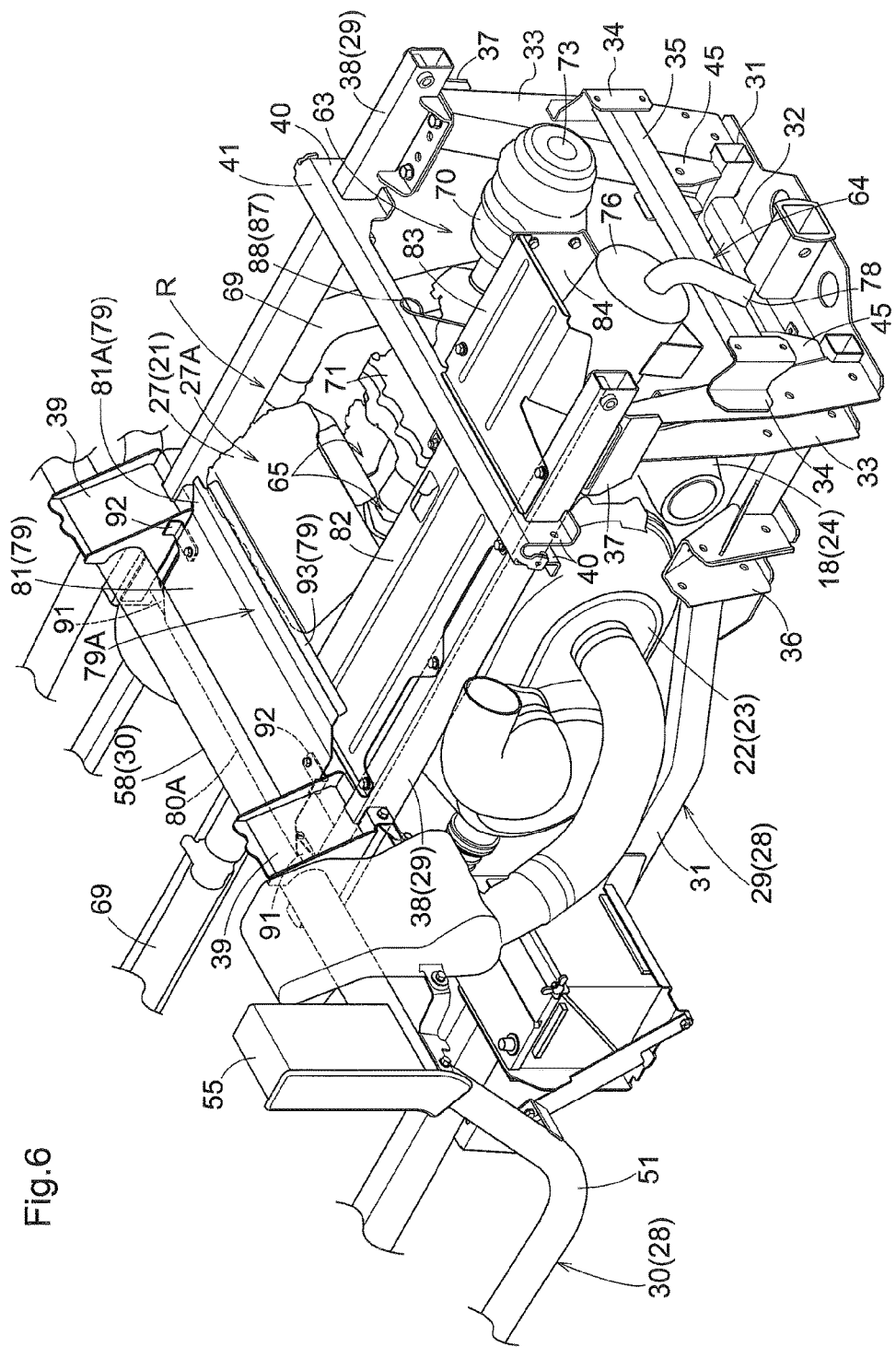
FIG. 6 is a perspective view showing an area around the engine.

As shown in FIG. 6 and so on, the right and left supporting frames 31 are each configured with a rectangular pipe. The right and left supporting frames 31 each have a bent shape, in which a rear section extends along a front-rear direction, an intermediate section in the front-rear direction diagonally extends to the outer side of the vehicle body from the rear section to a front section, and the front section extends along the front-rear direction of the vehicle body.

Figure 3:
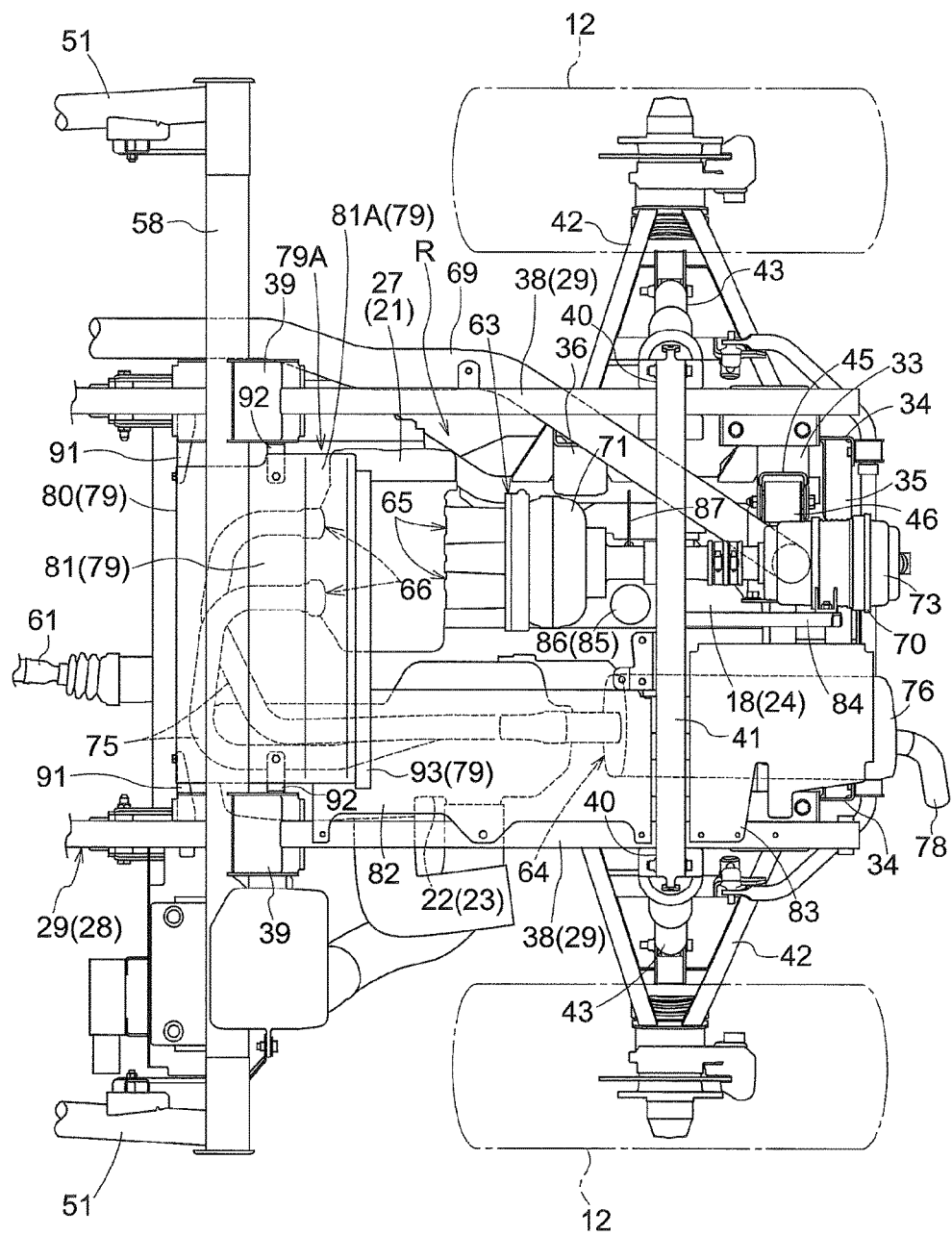
FIG. 3 is a plan view showing an area around the engine.
Figure 9:
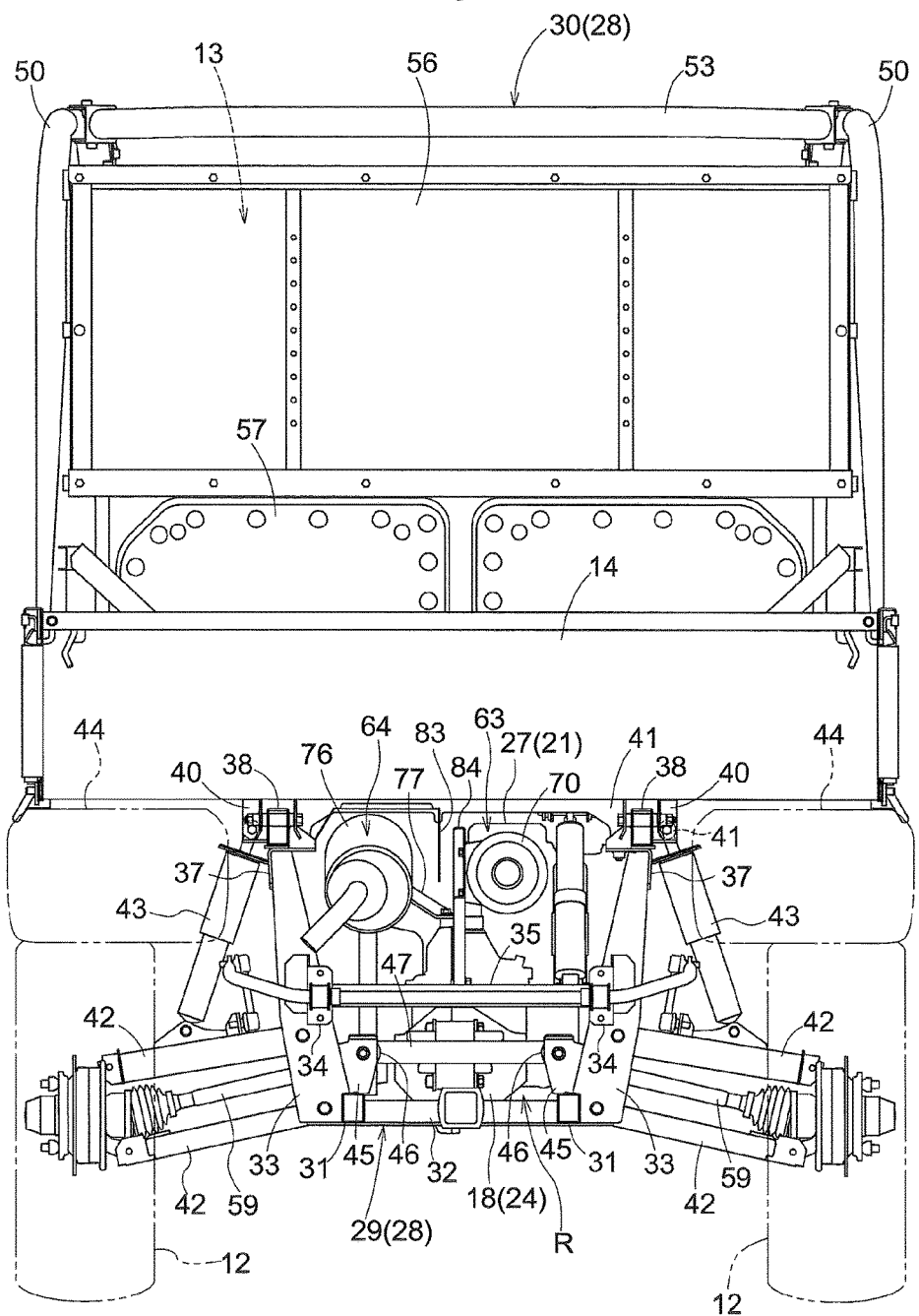
FIG. 9 is a rear view showing the utility vehicle.

As shown in FIGS. 3 and 9, pairs of suspension frames 42 of a double wishbone type are provided such that each pair of suspension frames 42 spans the corresponding rear vertical frame 33 and the corresponding front vertical frame 36. Thus, the rear wheels 12 are supported by the pairs of suspension frames 42. As shown in FIGS. 1 and 2, suspension cylinders 43 are each provided between the corresponding support bracket 40 and the corresponding pair of suspension frames 42. Rear wheel fenders 44 that cover the upper side of the rear wheels 12 are supported by rear portions of the upper front-rear frames 38.

Figure 10:
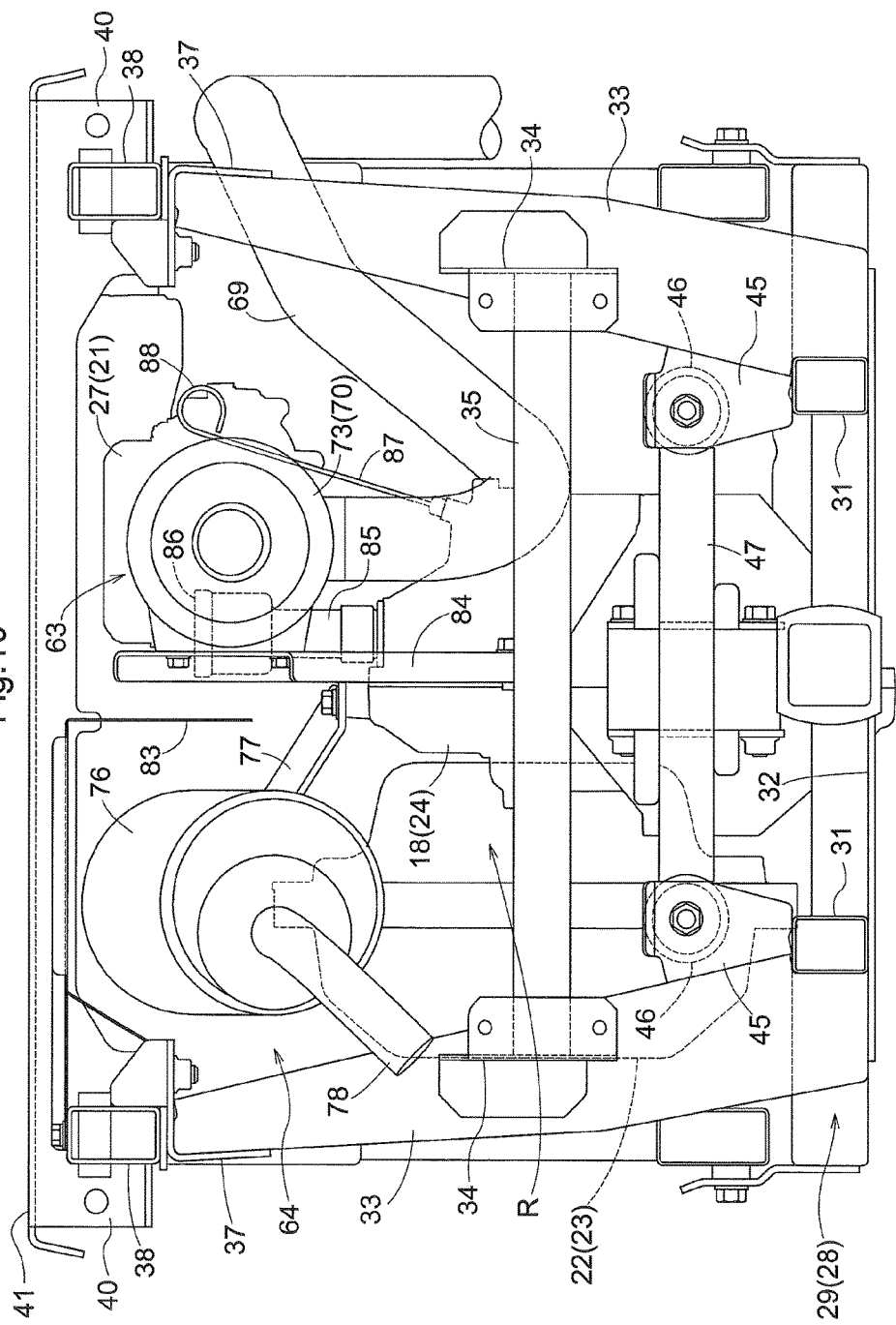
FIG. 10 is a rear view showing an area around the engine.

As shown in FIGS. 3, 4 and 10, rear vibration absorption mounts 46 are respectively supported by the right and left rear vertical frames 33 with third brackets 45 therebetween. A supporting member 47 that extends in the right-left direction is provided between the right and left rear vibration absorption mounts 46. A rear end portion of the transmission case 18 is supported by the supporting member 47. A front lower portion of the engine 21 is supported by the right and left supporting frames 31 with a pair of right and left front vibration absorption mounts 48 therebetween.

As shown in FIGS. 1, 2 and so on, the protection frames 30 include: pair of right and left upper frames 50 that are each invert U-shaped in side view; and a pair of right and left lower frames 51 that are each U-shaped in side view. The upper frames 50 and the lower frames 51 are each configured with a pipe frame. The protection frames 30 also include: a front upper frame 52 that extends in a right-left direction and is provided between front upper portions of the right and left upper frames 50; a rear upper frame 53 that extends in a right-left direction and is provided between rear upper portions of the right and left upper frames 50; front joint members 54 that joins front lower end portions of the upper frames 50 and front upper end portions of the lower frames 51 to each other; rear joint members 55 that joins rear lower end portions of the upper frames 50 and rear upper end portions of the lower frames 51 to each other; and so on. A window member 56 that extends in a vertical direction and has front and rear surfaces; and protection panels 57 that each extend in a vertical direction and each have front and rear surfaces are provided between the right and left upper frames 50 located rearward of the driver's seat 15. A lateral frame 58 that is configured with a pipe frame extending in a right-left direction is provided between lower end portions of the right and left rear joint members 55. Handrail frames 90 that an occupant can grip when boarding or exiting the travelling vehicle body are respectively joined to the rear joint members 55.

As can be seen from FIG. 2, power from the engine 21 is input to the belt type continuously variable transmission mechanism 23, and is subjected to stepless speed change according to the rotation speed of the engine 21. Power from the belt type continuously variable transmission mechanism 23 is then output to the gear type transmission mechanism 24. In response to an operation using the shift lever 19, the gear type transmission mechanism 24 realizes: forward travelling states (a forward first-gear state and a forward second-gear state) in which the gear type transmission mechanism converts power input from the belt type continuously variable transmission mechanism 23 to forward travelling power and outputs the forward travelling power; a rearward travelling state in which the gear type transmission mechanism 24 converts power input from the belt type continuously variable transmission mechanism 23 to rearward travelling power and outputs the rearward travelling power; and a neutral state in which the gear type transmission mechanism 24 does not transmit power input from the belt type continuously variable transmission mechanism 23. Power from the gear type transmission mechanism 24 is transmitted to a rear axle 59, and is transmitted from the rear axle 59 to the right and left rear wheels 12. Power from the gear type transmission mechanism 24 is transmitted to a front axle 62 via a power take-off shaft 60, a propeller shaft 61 and so on, and is transmitted from the front axle 62 to the right and left front wheels 11. The power take-off shaft 60 is located below the engine 21. When a clutch mechanism (not shown in the drawings) provided for the gear type transmission mechanism 24 is brought into an off state, a two-wheel drive state is realized, in which the gear type transmission mechanism 24 transmits power to only the right and left rear wheels 12, and does not transmit power to the right and left front wheels 11. When the clutch mechanism (not shown in the drawings) is brought into an on state, a four-wheel drive state is realized, in which the gear type transmission mechanism 24 transmits power to the right and left rear wheels 12 and the right and left front wheels 11.

Intake Device and Exhaust Device

As shown in FIGS. 2 to 6, the travelling vehicle body is provided with: an intake device 63 that introduces external air to the engine 21; and an exhaust device 64 that discharges exhaust gas from the engine 21. The intake device 63 is connected to an intake air inlet port 65 that is formed in the rear portion of the engine 21. The exhaust device 64 is connected to exhaust gas outlet ports 66 that are open in a front surface of the engine. As shown in FIGS. 2 and 3, the intake device 63 and the exhaust device 64 are separately located on right and left sides of the engine 21.

As shown in FIG. 2 and so on, the intake device 63 is provided with: an intake pipe 69 thorough which air that is to be introduced to the engine 21 passes; an air cleaner 70 that removes dust from the air; and an intake air divider 71.

As shown in FIGS. 1 and 2, the intake pipe 69 is provided with an external air intake port 72 through which external air is introduced. One end portion of the intake pipe 69 is connected to a lower portion of the air cleaner 70. The intake pipe 69 is extended along the front-rear direction of the vehicle body, and passes below the driving section 13. The other end portion of the intake pipe 69 is extended to an area below the front hood 25. The intake pipe 69 is located so as to pass through one side of the engine 21 that is opposite to the side where the exhaust device 64 is located. The external air intake port 72 formed in the other end portion of the intake pipe 69 is located within the isolation space S that is formed within the front hood 25 and the driving panel 20.

As shown in FIGS. 2, 3, 6 and so on, the air cleaner 70 is located rearward of the engine 21 such that the longitudinal direction of the air cleaner 70 extends along the front-rear direction of the vehicle body. The air cleaner 70 is provided with a lid 73 for element replacement. The lid 73 is formed on a rear end portion of the air cleaner 70. The lid 73 is fastened to a main body portion of the air cleaner 70 using a buckle-shaped fastening member (not shown in the drawings), and is configured to allow an operator to open and close the main body portion of the air cleaner 70 by operating the fastening member.

The intake air divider 71 divides air supplied from the air cleaner 70, from which dust has been removed, and supplies the divided portions of air to the combustion chambers of the engine 21. The transmission case 18 is located downward of the air cleaner 70 and the intake air divider 71.

Exhaust Device

As shown in FIG. 2 and so on, the exhaust device 64 is provided with: exhaust pipes 75 through which exhaust gas from the engine 21 passes through; and a muffler 76 that is able to reduce exhaust sound.

As shown in FIG. 2 and so on, the exhaust pipes 75 extend forward of the vehicle body from the exhaust gas outlet ports 66 of the engine 21, then curve, pass along a side of the engine 21 to avoid the engine 21, and extend rearward of the vehicle body. The exhaust pipes 75 are located so as to pass above the belt type continuously variable transmission mechanism 23. Two exhaust pipes 75 are extend from a rear end portion of the engine 21, and the two exhaust pipes 75 are joined to each other at a front end portion of the muffler 76.

As shown in FIGS. 2, 6, 9 and so on, the muffler 76 is located rearward of the engine 21 such that the longitudinal direction of the muffler 76 extends along the front-rear direction of the vehicle body. A catalyst (not shown in the drawing) for purifying exhaust gas from the engine 21 is provided inside the muffler 76. The catalyst appropriately fulfils the function of purifying exhaust gas in a predetermined high-temperature environment. The muffler 76 is located upward of the housing 22 that houses the belt type continuously variable transmission mechanism 23. The muffler 76 is supported by the transmission case 18 with a supporting stay 77 therebetween.

As shown in FIGS. 3, 6, 10 and so on, the air cleaner 70 and the muffler 76 are located within a space surrounded by the upper intermediate horizontal frame 41, the intermediate horizontal frame 35, the right and left rear vertical frames 33, and the upper front-rear frames 38. More specifically, the air cleaner 70 and the muffler 76 are located between the right and left rear vertical frames 33. An exhaust gas outlet portion 78 of the muffler 76 is located rearward of the mounting frames 29. The lid 73 of the air cleaner 70 is located rearward of the mounting frames 29.

Heat Insulation Members

As shown in FIG. 4, the driver's seat 15 and the auxiliary seat 16 are located forward of, and diagonally upward of, front portions of the exhaust pipes 75. As shown in FIGS. 3 to 8, a first heat insulation member 79 (corresponding to "cover") is provided to separate the driving section 13 and the exhaust pipes 75 of the exhaust device 64 from each other. The first heat insulation member 79 covers the front portions of the exhaust pipes 75. As shown in FIG. 3, the first heat insulation member 79 is formed to have a right-left width that is sufficient to cover the entire right-left width of the exhaust pipes 75. In other words, the first heat insulation member 79 is wider than the exhaust pipes 75 in the right-left direction.

As shown in FIGS. 3 to 8, the first heat insulation member 79 includes: a front-side portion 80 that covers the front side of the front portions of the exhaust pipes 75; an upper-side portion 81 that extends rearward from an upper end portion 80A of the front-side portion 80 and covers the upper side of the front portions of the exhaust pipes 75; and an extension portion 81A that extends rearward from a rear end portion of the upper-side portion 81 and covers the upper side of a front portion of the cylinder head 27 of the engine 21. The front-side portion 80, the upper-side portion 81, and the extension portion 81A of the first heat insulation member 79 are integrally formed by bending a metal plate. A rear end portion 79A of the first heat insulation member 79 extends to a position near a central position of the cylinder head 27 in the front-rear direction, and is inclined downward in a diagonally rearward direction. As shown in FIG. 4, the upper-side portion 81 extends to a position immediately below the front end portion of the load carrying platform 14. The first heat insulation member 79 separates the exhaust pipes 75 of the exhaust device 64 and the driving section 13 from each other, and also separates the load carrying platform 14 and the exhaust pipes 75 from each other.

Figure 7:
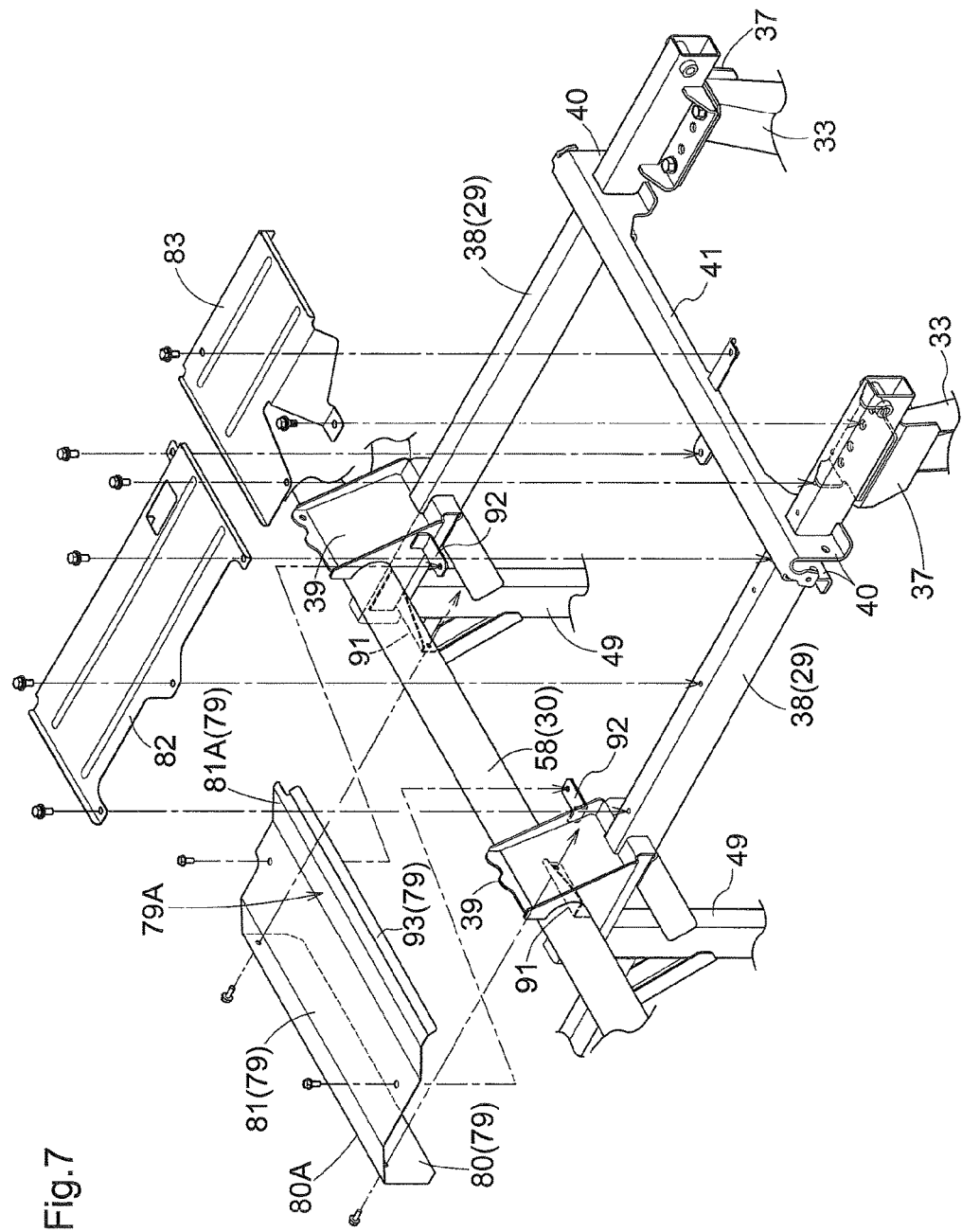
FIG. 7 is an exploded perspective view showing each of a plurality of heat insulation members.

As shown in FIGS. 6, 7 and so on, the first heat insulation member 79 is fixed to the mounting frames 29. Two end portions, namely right and left end portions, of the front-side portion 80 of the first heat insulation member 79 are respectively joined to first stays 91 using bolts. The first stays 91 each have an L-shaped cross section, and respectively extend inward from the upper front-rear frames 38 in a lateral direction. The right and left end portions of the front-side portion 80 are thus supported by the upper front-rear frames 38. Two portions of the upper-side portion 81 of the first heat insulation member 79, which are located inward of the first stays 91 in a lateral direction, are respectively joined to second stays 92, using bolts. The second stays 92 each have an L-shaped cross section, and respectively extend inward from joint members 39 in a lateral direction. The two portions of the upper-side portion 81 are thus supported by the joint members 39.

Figure 8:
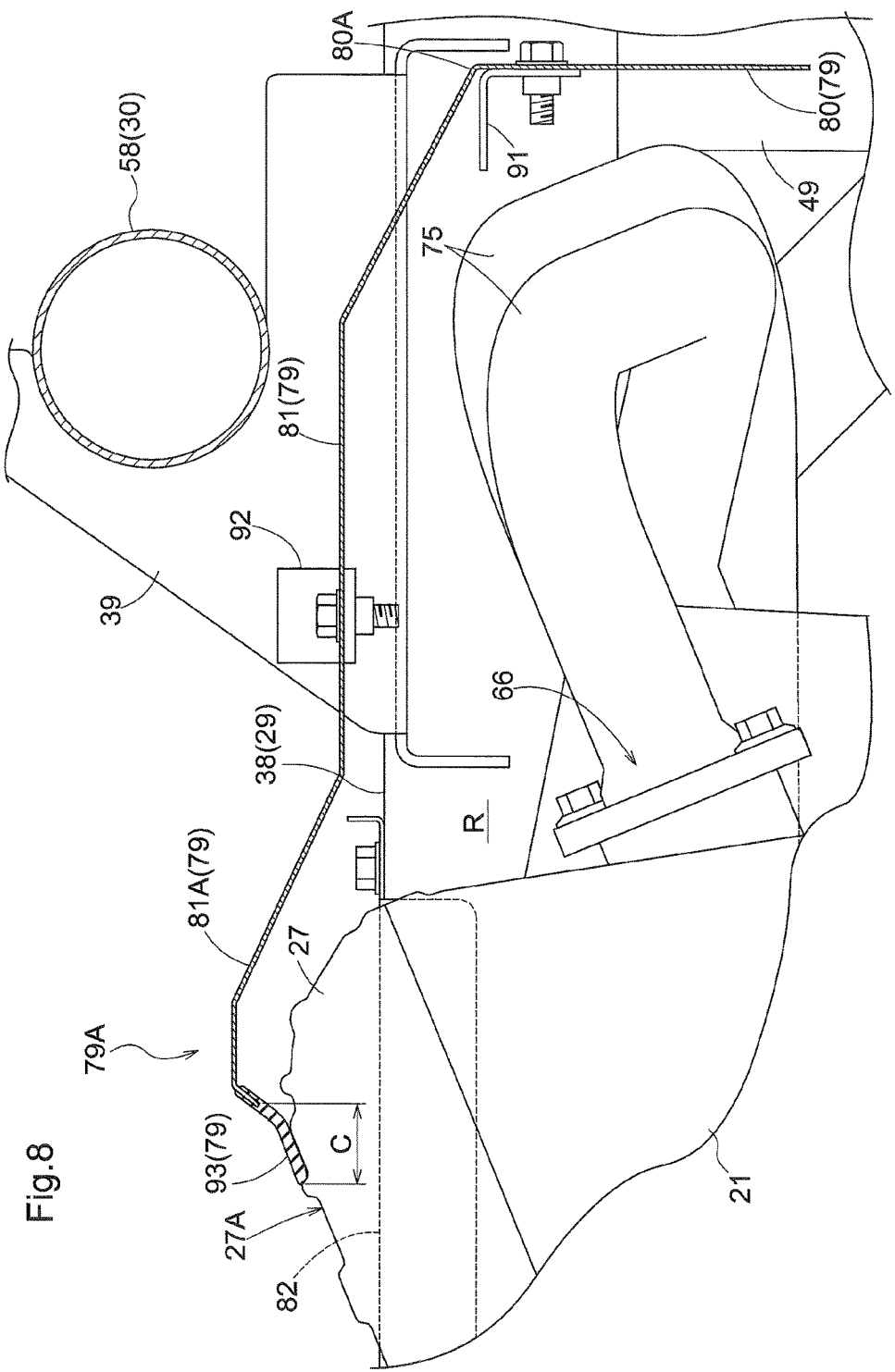
FIG. 8 is a right side view showing an area around a first isolation member.

As shown in FIGS. 4, 5 and 8, a clearance C is provided between a rear end portion of the extension portion 81A and the upper surface 27A of the front portion of the cylinder head 27. As shown in FIGS. 3 to 8, the first heat insulation member 79 includes a resin member 93 that is heat resistant and elastic, and that fills the clearance C. As shown in FIG. 3 and so on, the resin member 93 has a laterally elongated shape and covers a substantially entire area of the upper surface 27A of the cylinder head 27 of the engine 21.

As shown in FIG. 4, a gap V extending in a front-rear direction is provided between: the driver's seat 15 and auxiliary seat 16; and the load carrying platform 14. The first heat insulation member 79 is located below the gap V.

As shown in FIGS. 3 to 6 and so on, a front-side second heat insulation member 82 (an example of the "second heat insulation member") is provided between the load carrying platform 14 and the exhaust pipes 75 of the exhaust device 64. The front-side second heat insulation member 82 separates the load carrying platform 14 and the exhaust pipes 75 from each other. The extension portion 81A and the resin member 93 of the first heat insulation member 79 extend in a right-left direction so as to cover the front portion of the cylinder head 27 of the engine 21 and a portion of the front-side second heat insulation member 82. A rear-side second heat insulation member 83 (an example of the "second heat insulation member") is provided between the load carrying platform 14 and the muffler 76 of the exhaust device 64. The rear-side second heat insulation member 83 separates the load carrying platform 14 and the muffler 76 from each other. As shown in FIGS. 6, 7 and so on, the front-side second heat insulation member 82 is supported by the upper front-rear frames 38 at a position that is forward of the upper intermediate horizontal frame 41, by being joined to the upper front-rear frames 38 using bolts. The rear-side second heat insulation member 83 is supported by the upper front-rear frames 38 at a position that is rearward of the upper intermediate horizontal frame 41, by being joined to the upper front-rear frames 38 using bolts.

As shown in FIGS. 3 to 7, a third heat insulation member 84 is provided rearward of the engine 21 to separate the air cleaner 70 of the intake device 63 and the muffler 76 of the exhaust device 64 from each other. The air cleaner 70 of the intake device 63 is supported by the engine 21 with the third heat insulation member 84 therebetween. In other words, the third heat insulation member 84 also serves as a member for supporting the air cleaner 70.

Oil Feeding Member

As shown in FIGS. 4 to 8, the transmission case 18 is provided with an oil feeding member 85 for feeding hydraulic oil to the transmission case 18. The oil feeding member 85 is a cylindrical member that is located such that the longitudinal direction thereof extends in a top-bottom direction. An oil feeding port 86 is formed in an upper end portion of the oil feeding member 85. The oil feeding member 85 is located so as to overlap the air cleaner 70 in rear view. It is possible to refill the transmission case 18 with hydraulic oil by pouring refill hydraulic oil from the oil feeding port 86. The oil feeding member 85 is located between the intake air divider 71 of the intake device 63 and the muffler 76 of the exhaust device 64. The oil feeding port 86 formed in the upper end portion of the oil feeding member 85 is located upward of the intake air inlet port 65.

Oil Inspection Stick

As shown in FIGS. 4 and 6 to 8, an oil inspection stick 87 used for inspecting the condition of hydraulic oil within the transmission case 18 is provided for the transmission case 18. The oil inspection stick 87 is located opposite the muffler 76 of the exhaust device 64 with respect to the intake air divider 71 of the intake device 63. A grip 88 of the oil inspection stick 87 is located upward of the intake air inlet port 65.

Other Embodiments

The following describes other embodiments according to the present invention. The embodiment above and the other embodiments below may be combined as appropriate unless a contradiction occurs. Note that the scope of the present invention is not limited to these embodiments.

Figure 11:
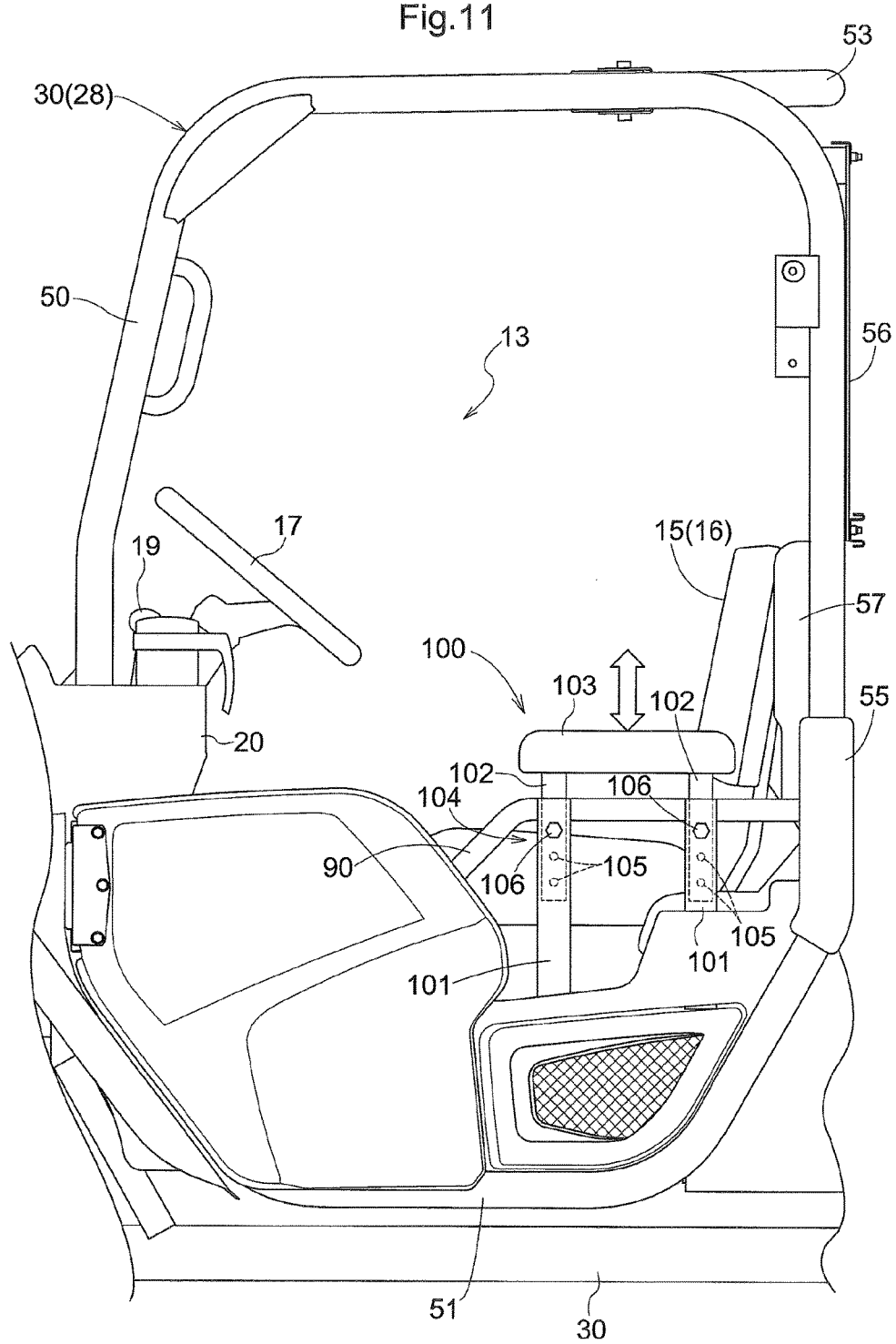
FIG. 11 is a side view showing an armrest according to another embodiment.

(1) An armrest 100 as shown in FIG. 11 may be provided on a lateral side of the driver's seat 15 and the auxiliary seat 16 according to the embodiment above. The armrest 100 includes: a pair of front and rear supporting posts 101 that are supported by the vehicle body frames 28; an armrest part 103 having leg parts 102 respectively corresponding to the supporting posts 101; and an adjustment part 104 that can adjust the height of the armrest part 103. The adjustment part 104 is configured to allow an operator to select appropriate holes 105 from among a plurality of holes 105 arranged along a height direction in each leg part 102, and to fasten fastening members 106 such as bolts to the supporting posts 101. The supporting posts 101 are joined to and supported by the handrail frame 90 in the vicinity of the driver's seat 15 or the auxiliary seat 16. The height of the armrest part 103 is adjustable to be higher than the handrail frame 90. Note that such an armrest 100 may be provided only on the driver's seat 15 side or only on the auxiliary seat 16 side.

Such an armrest 100 allows an occupant seated on the driver's seat 15 or the auxiliary seat 16 to place his/her arm on the armrest part 103 and easily maintain the seating position while the travelling vehicle body is travelling. Also, since the armrest 100 is provided with the adjustment part 104 with which the height of the armrest part 103 can be adjusted, the height of the armrest part 103 can be appropriately adjusted to fit to the occupant's physical constitution.

(2) In the embodiment above, the driver's seat 15 and the auxiliary seat 16 are described as examples of the "seat". However, "seat" is not limited to them. For example, "seat" of another type, such as a laterally elongated seat on which a plurality of people can be seated, may be adopted.

(3) In the embodiment above, the engine 21 in which the cylinder head 27 is inclined downward in a diagonally rearward direction is described as an example. However, the engine 21 is not limited to such a configuration. For example, an engine in which the cylinder head is not inclined and is substantially vertically standing up may be adopted.

(4) In the embodiment above, the first heat insulation member 79 including the resin member 93 that fills the clearance C between the rear end portion of the extension portion 81A and the upper surface 27A of the front portion of the cylinder head 27 is described as an example of the "cover". However, the first heat insulation member 79 is not limited to such a configuration, and it is acceptable that such a resin member 93 is not provided.

(5) In the embodiment above, a description has been given of an example in which the first heat insulation member 79 serving as the "cover" is wider than the exhaust pipes 75 in the right-left direction. However, the first heat insulation member 79 is not limited to such a configuration. For example, the first heat insulation member 79 may be narrower than the exhaust pipes 75 in the right-left direction.

(6) In the embodiment above, a description has been given of an example in which the first heat insulation member 79 serving as the "cover" is fixed to the mounting frames 29 serving as the "frame". However, the present invention is not limited to such a configuration. For example, the first heat insulation member 79 may be fixed to the protection frames 30 serving as the "frame". Alternatively, the first heat insulation member 79 may be fixed to both the mounting frames 29 and the protection frames 30 serving as the "frame".

(7) In the embodiment above, a description has been given of an example in which the exhaust gas outlet port 66 connected to the exhaust device 64 is formed in the front portion of the engine 21, and the intake air inlet port 65 connected to the intake device 63 is formed in the rear portion of the engine 21. However, the present invention is not limited to such a configuration. For example, the exhaust gas outlet port 66 may be formed in the rear portion of the engine 21, and the intake air inlet port 65 may be formed in the front portion of the engine 21. Alternatively, the exhaust gas outlet port 66 and the intake air inlet port 65 may be formed close to each other in the front portion or the rear portion of the engine 21.

(8) In the embodiment above, a description has been given of an example in which the muffler 76 is located such that the longitudinal direction thereof extends along the front-rear direction of the vehicle body. However, the present invention is not limited to such a configuration. The muffler 76 may be located such that the longitudinal direction thereof extends along the right-left direction of the vehicle body.

(9) In the embodiment above, a description has been given of an example in which the air cleaner 70 is located such that the longitudinal direction thereof extends along the front-rear direction of the vehicle body. However, the present invention is not limited to such a configuration. The air cleaner 70 may be located such that the longitudinal direction thereof extends along the right-left direction of the vehicle body.

(10) In the embodiment above, a description has been given of an example in which the exhaust pipes 75 pass along a side of the engine 21 to avoid the engine 21. However, the present invention is not limited to such a configuration. For example, the exhaust pipes 75 may be located so as to pass above the engine 21 to avoid the engine 21.

(11) In the embodiment above, a description has been given of an example in which the exhaust pipes 75 are located so as to pass above the belt type continuously variable transmission mechanism 23. However, the present invention is not limited to such a configuration. For example, the exhaust pipes 75 may be located so as to pass along a lateral outer side of the belt type continuously variable transmission mechanism 23.

(12) In the embodiment above, an example has been given of an example in which the lid 73 of the air cleaner 70 is formed on the rear end portion of the air cleaner 70. However, the present invention is not limited to such a configuration. For example, the lid 73 of the air cleaner 70 may be formed on another portion such as a lower portion of the air cleaner 70.

(13) In the embodiment above, a description has been given of an example in which the external air intake port 72 of the intake pipe 69 is located in the isolation space S formed within the front hood 25. However, the present invention is not limited to such a configuration. For example, the external air intake port 72 of the intake pipe 69 may be located at a position where air that is relatively less contaminated with dust is present, such as a position that is rearward of the driver's seat 15 of the driving section 13.

(14) In the embodiment above, a description has been given of an example that is provided with the first heat insulation member 79, the front-side second heat insulation member 82, the rear side second heat insulation member 83, and the third heat insulation member 84. However, the present invention is not limited to such a configuration. For example, the first heat insulation member 79, the front-side second heat insulation member 82, the rear-side second heat insulation member 83, or the third heat insulation member 84 may be omitted.

(15) In the embodiment above, the engine 21, which is a gasoline engine, has been described as an example. However, the engine 21 is not limited to a gasoline engine. For example, another type of engine such as a diesel engine may be adopted.

(16) In the embodiment above, a description has been given of an example provided with the belt type continuously variable transmission mechanism 23. However, the present invention is not limited to such a configuration. For example, a hydraulic static continuously variable transmission device may be provided instead of the belt type continuously variable transmission mechanism 23.

(17) The present invention is applicable to various types of work vehicles such as tractors and combines, in addition to the utility vehicle described above.

What is claimed is:

1. A utility vehicle comprising:
a vehicle body;
a seat mounted on the vehicle body;
an engine located behind the seat relative to a longitudinal direction of the vehicle body, the engine being provided with a cylinder head, and having an exhaust gas outlet port that is open in a front surface of the engine;
an exhaust pipe that extends forward from the exhaust gas outlet port, then curves, and extends rearward relative to the longitudinal direction; and
a heat insulation member that covers the front portion of the exhaust pipe behind the seat relative to the longitudinal direction, the heat insulation member including:
   a front-side portion that covers a front side of the front portion of the exhaust pipe;
   an upper-side portion that extends rearward from an upper end portion of the front-side portion and covers an upper side of the front portion of the exhaust pipe;
   an extension portion that extends rearward from a rear end portion of the upper-side portion and covers an upper side of a front portion of the cylinder head; and
   a framework that surrounds the engine, the framework including right and left longitudinal frames extending along the longitudinal direction in right and left upper regions relative to the engine, respectively, wherein the front-side portion of the heat insulation member is supported by and between respective front end portions of the right and left longitudinal frames.

2. The utility vehicle according to claim 1, wherein
an upper surface of the cylinder head is inclined downward in a diagonally rearward direction relative to the longitudinal direction, and
a rear end portion of the heat insulation member extends to a position near a central position of the cylinder head in the longitudinal direction, and is inclined downward in a diagonally rearward direction relative to the longitudinal direction.

3. The utility vehicle according to claim 1, wherein
a clearance is provided between a rear end portion of the extension portion and the front portion of the cylinder head relative to the longitudinal direction, and
the heat insulation member is provided with a resin member that is heat resistant and elastic, and that fills the clearance.

4. The utility vehicle according to claim 1, further comprising:
a load carrying platform configured to be mounted with luggage,
wherein a gap extending in the longitudinal direction is provided between the load carrying platform and the seat, and the heat insulation member is located below the gap.

5. The utility vehicle according to claim 1, wherein
the heat insulation member is formed to be wider than the exhaust pipe in a right-left direction of the vehicle body, the right-left direction extending at right angles to the longitudinal direction as seen from above the utility vehicle.

6. The utility vehicle according to claim 1, further comprising:
a load carrying platform extending upwardly of the engine; and
a second heat insulation member extending rearward from the heat insulation member in the longitudinal direction to separate the load carrying platform and the exhaust pipe from each other.

7. The utility vehicle according to claim 6, further comprising:
a third heat insulation member extending rearward of the engine relative to the longitudinal direction from the second heat insulation member.

8. A work vehicle comprising:
a vehicle body;
an engine located in a rear portion in a longitudinal direction of the vehicle body;
an intake device configured to introduce air into the engine;
an exhaust device configured to discharge exhaust gas from the engine, the exhaust device including an exhaust pipe through which exhaust gas discharged from the engine passes through, wherein the intake device and the exhaust device are separately located on right and left sides of the engine in a right-left direction of the vehicle body, the right-left direction extending at right angles to the longitudinal direction as seen from above the work vehicle;
a driving section provided forward of the engine in the longitudinal direction;
a heat insulation member that separates the driving section and the exhaust pipe from each other; and
a framework that surrounds the engine, the framework including right and left longitudinal frames extending along the longitudinal direction in right and left upper regions relative to the engine, respectively, wherein the heat insulation member is supported by and between respective front end portions of the right and left longitudinal frames.

9. The work vehicle according to claim 8, wherein
an exhaust gas outlet port that is connected to the exhaust device is formed in a front portion of the engine relative to the longitudinal direction, and
an intake air inlet port that is connected to the intake device is formed in a rear portion of the engine relative to the longitudinal direction.

10. The work vehicle according to claim 9, further comprising:
a transmission case that is joined to the rear portion of the engine relative to the longitudinal direction, the transmission case being provided with an oil feeding member for feeding hydraulic oil to the transmission case,
wherein an upper end portion of the oil feeding member is located upward of the intake air inlet port.

11. The work vehicle according to claim 9, further comprising:
a transmission case that is joined to the rear portion of the engine relative to the longitudinal direction; and
an oil inspection stick used for inspecting a condition of hydraulic oil within the transmission case, the oil inspection stick having a grip that is located upward of the intake air inlet port.

12. The work vehicle according to claim 8, wherein
the exhaust device is provided with a muffler configured to reduce exhaust sound, and the muffler is located rearward of the engine relative to the longitudinal direction such that a longitudinal direction of the muffler extends along the longitudinal direction.

13. The work vehicle according to claim 8, wherein
the exhaust pipe extends forward of the vehicle body from the engine, then curves, passes along a side of the engine to avoid the engine, and extends rearward of the vehicle body relative to the longitudinal direction.

14. The work vehicle according to claim 13, further comprising:
a belt type continuously variable transmission mechanism to which power from the engine is input,
wherein the exhaust pipe passes above the belt type continuously variable transmission mechanism.

15. The work vehicle according to claim 8, further comprising:
a load carrying platform provided upward of the engine; and
a second heat insulation member that separates the load carrying platform and the exhaust pipe from each other.

16. The work vehicle according to claim 8, wherein
the intake device is provided with an air cleaner configured to remove dust from air, and
the air cleaner is located rearward of the engine such that a longitudinal direction of the air cleaner extends along the longitudinal direction.

17. The work vehicle according to claim 16, wherein
the air cleaner is provided with a lid for element replacement, and
the lid is formed on a rear end portion of the air cleaner relative to the longitudinal direction.

18. The work vehicle according to claim 8, wherein
the intake device is provided with an intake pipe through which air to be introduced to the engine passes,
a front portion of the vehicle body is provided with a front hood relative to the longitudinal direction,
the intake pipe is provided with an external air intake port through which external air is introduced, and
the external air intake port is located within an isolation space formed within the front hood.

19. The work vehicle according to claim 8, further comprising:
a third heat insulation member that is located rearward of the engine relative to the longitudinal direction and separates the intake device and the exhaust device from each other.

20. The work vehicle according to claim 8, wherein
the engine is provided in a horizontal orientation so that a crank shaft extends along the right-left direction, and a cylinder head is inclined upward in a diagonally rearward direction relative to the longitudinal direction.

21. The work vehicle according to claim 8,
wherein the exhaust device is provided with a muffler configured to reduce exhaust sound, and
wherein the muffler is positioned behind the engine along the longitudinal direction of the vehicle body.

22. The work vehicle according to claim 8,
wherein the intake device is provided with an air cleaner configured to remove dust from the air,
wherein the exhaust device is provided with a muffler configured to reduce exhaust sound, and
wherein the air cleaner and the muffler are positioned behind the engine along the longitudinal direction of the vehicle body.

23. The utility vehicle according to claim 8, wherein the heat insulation member includes:
a front-side portion that covers a front side of the front portion of the exhaust pipe;
an upper-side portion that extends rearward from an upper end portion of the front-side portion and covers an upper side of the front portion of the exhaust pipe; and
an extension portion that extends rearward from a rear end portion of the upper-side portion and covers an upper side of a front portion of the cylinder head; and
wherein the front-side portion of the heat insulation member is supported by the respective front end portions of the right and left longitudinal frames.

\* \* \* \* \*

UNITED STATES PATENT AND TRADEMARK OFFICE
CERTIFICATE OF CORRECTION

PATENT NO. : 10,099,547 B2  
APPLICATION NO. : 15/164040  
DATED : October 16, 2018  
INVENTOR(S) : Hiroki Bessho et al.

Page 1 of 1

It is certified that error appears in the above-identified patent and that said Letters Patent is hereby corrected as shown below:

In the Claims

Column 16, Line 15, Claim 8, delete "work vehicle" and insert -- utility vehicle --

Signed and Sealed this  
Twenty-sixth Day of March, 2019

Andrei Iancu  
*Director of the United States Patent and Trademark Office*

UNITED STATES PATENT AND TRADEMARK OFFICE
CERTIFICATE OF CORRECTION

PATENT NO. : 10,099,547 B2
APPLICATION NO. : 15/164040
DATED : October 16, 2018
INVENTOR(S) : Hiroki Bessho et al.

It is certified that error appears in the above-identified patent and that said Letters Patent is hereby corrected as shown below:

In the Claims

Column 18, Line 26, Claim 23, delete "utility vehicle" and insert -- work vehicle --

Signed and Sealed this
Thirteenth Day of August, 2019

Andrei Iancu
*Director of the United States Patent and Trademark Office*